(12) United States Patent
Falchuk et al.

(10) Patent No.: US 8,620,846 B2
(45) Date of Patent: Dec. 31, 2013

(54) METHOD AND SYSTEM FOR IMPROVING PERSONAL PRODUCTIVITY IN HOME ENVIRONMENTS

(75) Inventors: Benjamin Falchuk, Upper Nyack, NY (US); Shoshana K. Loeb, Philadelphia, PA (US)

(73) Assignee: Telcordia Technologies, Inc., Piscataway, NJ (US)

( * ) Notice: Subject to any disclaimer, the term of this patent is extended or adjusted under 35 U.S.C. 154(b) by 606 days.

(21) Appl. No.: 12/691,077

(22) Filed: Jan. 21, 2010

(65) Prior Publication Data
US 2011/0178969 A1 Jul. 21, 2011

(51) Int. Cl.
G06Q 30/02 (2012.01)
G06N 99/00 (2010.01)

(52) U.S. Cl.
CPC .............. G06N 99/005 (2013.01); G06Q 30/02 (2013.01)
USPC ............................................ 706/45; 705/1.1

(58) Field of Classification Search
None
See application file for complete search history.

(56) References Cited

U.S. PATENT DOCUMENTS

| 5,485,402 A | 1/1996 | Smith et al. |
| 5,899,963 A | 5/1999 | Hutchings |
| 2009/0102676 A1* | 4/2009 | Hoffmann et al. ......... 340/686.6 |
| 2010/0082376 A1* | 4/2010 | Levitt ................................ 705/7 |
| 2010/0295676 A1* | 11/2010 | Khachaturov et al. ........ 340/540 |
| 2011/0057790 A1* | 3/2011 | Martin et al. ............. 340/539.13 |

OTHER PUBLICATIONS

Devaul et al., The Memory Glasses: Subliminal vs. Overt Memory Support with Imperfect Information, Proceedings of the Seventh IEEE International Symposium on Wearable Computer, Copyright Year: 2003.
Sohn et al., Place-its: A Study of Location-Based Reminders on Mobile Phones. In UbiComp'05: Seventh International Conference on Ubiquitous Computing, pp. 232-250, Tokyo, Ja.
Morrison et al., Using Location, Bearing and Motion Data to Filter Video and System Logs, Pervasive 2007, LNCS 4480, pp. 109-126, 2007.
Stuntebeck et al., Wideband powerline positioning for indoor localization, Proc. Int'l Conf. on Ubiquitous Computing, 2008.
Beauregard et al., Pedestrian Dead Reckoning, A Basis for Personal Positioning, Proceedings of the 3rd Workshop on Positioning, Navigation and Communication (WPNC'06), 2006.
Anagnostopoulos et al., OntoNav: Semantic Indoor Navigation System, Pervasive Computing Research Group, Communication Networks Laboratory, Dept. of Informatics & Telecommun.
Kim et al., Step, Stride, and Heading Determination for Pedestrian Navigation System, Journal of GPS, 2004.

* cited by examiner

*Primary Examiner* — Alan Chen
(74) *Attorney, Agent, or Firm* — Philip J. Feig

(57) ABSTRACT

Method and system for improving personal productivity in home environments may store state information associated with an environment and one or more users in a knowledge base, detected activity of a user, infer location of the user based on the detected activity, and suggest one or more tasks to be performed based on the inferred user location.

26 Claims, 11 Drawing Sheets

METHOD AND SYSTEM FOR IMPROVING PERSONAL PRODUCTIVITY IN HOME ENVIRONMENTS

FIELD OF THE INVENTION

The present application relates generally to computer systems, communications and networks, and more particularly to improving personal productivity in home environments.

BACKGROUND

Productivity has long been a goal for information workers and factory workers but now, with the emergence of so-called smart-homes, it has become more feasible to enable productivity and efficiency in the home. With an aging population, the dramatic increase in the size of homes, and the increased pressure on people's time, any technology focused on simplifying and decluttering the daily routines is desirable. While today's corporate productivity tools may manage tasks, contacts, and progress, there is no such system to augment productivity within the home. At the home, household tasks such as laundry, taking out the garbage, cleaning, etc. would benefit from systematic management (the user may also be in a hybrid context in which he is at home and also teleworking).

With respect to household efficiency, users may have a set of future and ongoing personal goals (household-based or otherwise) that their corporate productivity system cannot monitor. Examples of these might include: "Clean up the attic before the Holidays", and "Take out the garbage", "Write a chapter in my book". Note that the user is a mobile entity within the home, walking and moving from room to room and floor to floor. Additionally, the user's household contains objects of importance to the user and/or that play a role in household tasks. Examples may include: the home deed, the users keys, the laundry hamper, the laundry machine, the furnace, the rooms of the house (e.g., kitchen), and so on. Not being able to locate these objects can be frustrating to many homeowners, impedes progress on tasks involving the items, and reduces overall productivity. Therefore, while corporate systems have inventory management there is no system that helps users track the dynamically changing location of household items and their interrelationships. Also, despite smart-home advancements, fine-grain sensing and exploitation of user activity has yet to be fully realized and there is no standard for expressing the semantics of houses and the activities taking place within them.

Today's typical smart home deployments do not generally attempt to be proactive, nor do they integrate with a broad range of user contexts and tasks. Smart-homes are usually comprised of a large number of kinds of sensors integrated into rooms and appliances. Touch, weight, motion, and light sensitive sensor technology make many useful monitoring use cases possible. The current art of smart homes has been shown to work in managing physiological user information vis a vis user movements and activities. Real-time anomaly detection (e.g., the elderly user is in the bathroom who has not moved in many minutes) has been shown to help discover and avert tragedies.

With respect to home inventory, a great number of thick-client (PC-based) applications are available that help the user digitize information about her personal objects. However, these systems are intended to be stand-alone and archival, not highly interactive and dynamic. For example, they are cumbersome to be used to track and archive the movement of objects from room to room on a minute by minute basis.

While process management and workflow (WF) system have existed for many years, the WF systems do not typically use knowledge models. Few to no WF systems exist with the aim of improving personal productivity in the context of a modern Western home. This may be the case because it is difficult for systems to accurately infer user location within large homes and to compute over the complex notions of time, space, and location within the context of specific kinds of household.

BRIEF SUMMARY

A system and method for improving personal productivity in an environment are provided. The system, in one aspect, may include a knowledge base operable to store information such as state information, rules, attributes and associations, associated with an environment, objects associated with the environment, and one or more users. A server module may be operable to detect activity of a user and infer location of the user. The server module further may be operable to suggest one or more tasks to be performed based on the detected activity or inferred user location or combinations thereof.

A method of improving personal productivity in an environment, in one aspect, may include storing state information associated with an environment and one or more users in a knowledge base, and detecting activity of a user. The method may also include inferring location of the user based on the detected activity, and suggesting one or more tasks to be performed based on the inferred user location.

A program storage device readable by a machine, tangibly embodying a program of instructions executable by the machine to perforin methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
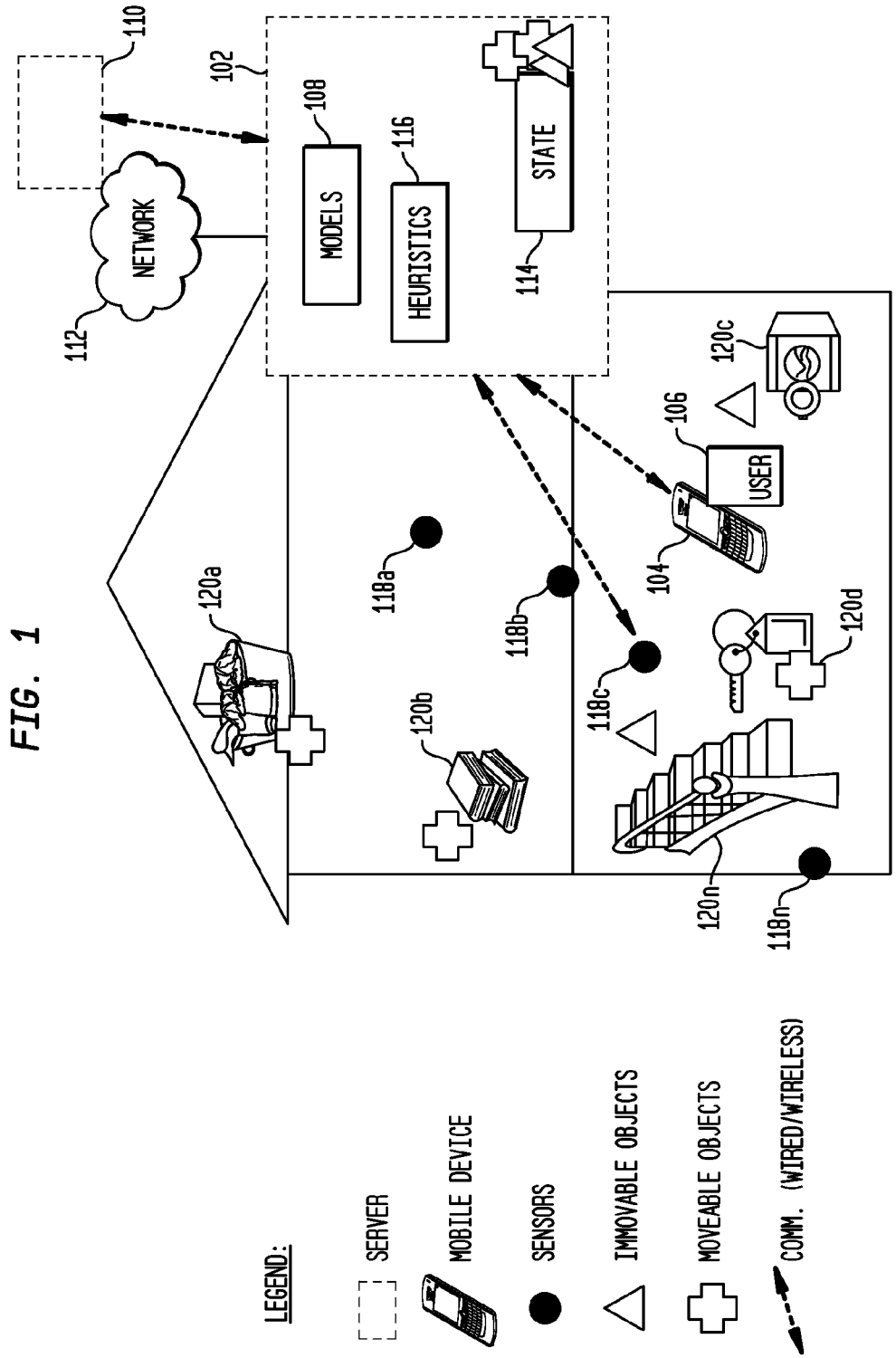
FIG. 1 illustrates an embodiment of system architecture of the present disclosure.

The present disclosure addresses improving user productivity in the home through notifications of the right type at the right time and place while the user may be in a difficult sensing environment (e.g., one in which accurately sensing the user's current or relative location is difficult). The present disclosure also addresses monitoring and inferring user locations in (small) enclosed and challenging environments (such as multi-level homes, office buildings). The present disclosure further addresses enabling automatic assistance to users to help them begin, work on, or finish tasks in these environments by providing notifications. The present disclosure further addresses enabling a digital inventory functionality, the heuristics and inference that assist in positioning, cataloging and storing information about locations, artifacts and tasks, and providing notifications that leverage those artifacts at the right time and place. The present disclosure, in one aspect, describes a system and method that helps improve user productivity in these environments by notifying them of tasks and activities at what is deemed the right place and time.

Unlike existing application of robotics that operates autonomously and without the human, the present disclosure in one aspect describes operating as augmentation or aid to the human actor. Focuses may be on what computers do best, e.g., remembering long lists of objects and their dependencies on time and space, and leaving to the human user what humans do best, e.g., use common sense to move about, identify objects and think conceptually about problems in space and time.

Rather than performing a predefined "routine", a system and/or method of the present disclosure (referred to herein interchangeably as a system) may be built to assume that the human knows what he or she is doing and may be meant to augment his memory in terms of tasks, objects, time, and space in the house. It may be utilized as a memory-aide not an autonomous actor (like a robot). While not responsible for any of the physical execution aspect, the system captures, among other things, aspects regarding where objects are and what is needed for what task, and how long certain tasks take. Further, as a result, it can support many more tasks, on the fly, that involve objects, space and time, and may not need to worry about knowing things that are very easy for humans but yet hard for computers (e.g., automatically identifying objects). However, the system is not limited by what types of additional functions can play sensor roles, and, in particular, short range sensor technology such as Radio Frequency Identification (RFID) may complement the system by providing identifiers as necessary (e.g., for a blind user).

The system reminds the human of things the human might have forgotten about the task he or she is undertaking, and as a result increase productivity and quality of the task. In another aspect, the system is not intended to interfere with, or be an annoyance to, the user; instead it would use best-practices to reach the end user in a fashion that conveys information it needs to express but also respects the limits of what can be conveyed before users become over-informed or annoyed. Also, the system may function as an add-on aide and its removal does not so much hinder the user but resets the user to relying on his or her own faculties, or on more primitive sensors working in isolation (e.g., RFID), without the benefits of global knowledge brought by the system. The system and method of the present disclosure may augment a smart-home system with additional inferencing and modeling capabilities, and giving the user new and improved productivity capabilities.

The system and method may work either in concert with existing smart-home services, making use of information sensed through the existing service, or as a stand-alone new service to an environment which makes use of new sensing equipment. In one aspect, the system functions may include, but are not limited to:

(1) Monitor, store and infer user location in enclosed and complex environments (such as multi-level homes, office buildings); heuristics and inference assist in positioning,
(2) Catalog and store knowledge about locations (including both user and artifact location), artifacts (including, but not limited to household objects and documents), and tasks related to a user. Provide notifications that relate to those artifacts and tasks at the right time and place,
(3) Make many aspects of the home environment machine-readable and exploitable in services.

The system, in one aspect, may include an Internet connected PC (or the like device connected to a communications network) and smartphone or the like device. Adding more technologies does not hamper the system. The user may issue directives into the system via the cellular phone keypad or touchscreen, a voice interface or other convenient interface (mobile or tethered) that is instrumented for the system, while notifications from the server may reach the user via a networked personal or home communications device such as a smartphone, networked television or speakers.

FIG. 1 illustrates an embodiment of system architecture of the present disclosure. At a high-level the system may include, but is not limited to, the following logical entities described with reference to FIG. 1. A user 106 may carry a mobile device 104 and seed the system with preferences and information. For example, the user may inject "directives" into the system through an input mode, for example (but not limited to), voice input and/or keypad input.

A mobile device 104 may be co-situated with user and may serve as both input and notification device. Alternatively or addition, a separate devices for notification may be used. The mobile device 104 may also play the role of sensor (e.g., sensing some information nearby) or actuator (e.g., affecting the environment through an action or movement). An example of a mobile device is a cellular telephone. Other examples may include, but are not limited to, a personal digital assistance (PDA) device, smartphone devices, portable computers, and others. The mobile device 104 may gather information from the user, track individual steps, make inferences, and communicate wirelessly with the server 102. The mobile device 104 may also realize notifications sent to it from the server 102 in an audible, tactile, or visual fashion up to the full capabilities of the mobile device 104.

A server 102 may be a computer system, a physical system in the home which builds a model and executes service logic. The server 102 has machine-readable models 108 of the environment. The server 102 manages the dynamically changing state of the system in a knowledge database. State 114 may include user state, for example tasks, workflows, current location, etc., which may be maintained and used by the server 102 to provide dynamic suggestions, for instance, with the goal of improving productivity or providing valuable information. The state 114 also may include locations (which may be both absolute and relative) that relate to the environment, the objects in the environment, and the user.

A user 106 may carry a device 104 and update the state 114 (e.g., tasks, and goals) using the device 104. For instance, the user 106 may make these updates through any input means up to the capabilities of the device (e.g., voice commands, textual input, user interface interactions, etc.). The user 106 may reset the user's location or actions, for example, by making specific interactions with the system, e.g., by uttering "I'm at bathroom 1". The user 106 may declare actions or state of objects, for instance, by speaking into the device 104, e.g., "walking up the stairs", "putting hamper near stairs."

The server 102 has rules and inference mechanisms 116 to help it formulate and deliver productivity-increasing information. The server 102 may interwork with other information services 110 on the local network or the Internet 112. Based on the inference rules 116, state 114 and/or other information, the server 102 decides which reminders to send and in what location and at what time.

Distributed Sensors and docking points sensors (e.g., 118a, 118b, 118c, . . . , 118n) report user presence and/or activity and use a wireless network to convey information to a server 102, e.g., over a network. Docking points allow a mobile device 104 without wireless capability, or one that requires a physical connection to operate, to physically connect to a logical port for the purposes of capturing or conveying information to the server; subsequent information may flow to the server 102 over a wired or wireless network.

Objects (e.g., 120a, 120b, 120c, 120d, . . . 120n), for example, relevant household objects (e.g., from small, to large, immovable, and moveable) are seeded into a knowledge base. Seeding an object refers to creating and/or storing information about the object. For example, once seeded, household objects and tasks may be encoded, saved, managed, and searched. Seeding may be performed using graphical interfaces on a computer, voice memos, voice recognition, speech-to-text, databases, ontologies, Radio-frequency identification (RFID) tags, Quick Response codes (QR), or the like. For instance, although not required, the objects may be identified and seeded into the system with wireless tags such as provided by RFID technology. The end result of seeding is that the server 102 can compute over the knowledge of these objects.

A server 102 may be local to the environment where the users are or could be accessible via a wide area network (e.g., Internet). The server 102 may increase user productivity by inferring proximity relations based on current and future conditions and tasks. For example, if location A is "near" location Z where user has an unfinished task, and user approaches A, the server may compute and infer this proximity relation, using the models 108 and heuristics 116, and prompt the user to perform the unfinished task. Similar computations may be performed for locations "farFrom" each other, "above", "below", and other position-related relationships. The server 102 may also increase user productivity through time and spatial suggestions. For instance, the server 102 may suggest tasks or task-components to the user if the user has an advantageous proximity, temporal, or other relationship with the task.

The server 102 may further increase productivity by inferring location. For example, in the absence of installed location sensors in the environment the server's knowledge model can accommodate compass (e.g., direction of travel) and pedometer (e.g., step counts) inputs in order to infer location (e.g., a compass and pedometer may be onboard components of the mobile device or may be add-on/separate/stand-alone components). For instance, the server may infer locations by counting steps and direction of travel and relating those to a previous location fix.

The server 102 may also increase system transparency by informing user of a degree of certainty. For instance, the server may track a certainty measure along with every location or action. In aggregate these measures can provide other system components with a confidence level for any given server suggestion and the system can provide audit data relating to the confidence of each primitive location fix that was used in the suggestion. The server may have rules which both increase and decrease certainty based on particular conditions.

The server 102 may also increase user productivity by understanding object co-incidence. For example, the server's knowledge model may accommodate object co-incidence which in turn can lead to better and more efficient suggestions. The server 102 may further increase system efficiency through pre-loading and/or unloading. For instance, the server can use the user location and past history to dynamically pre-load and unload information from memory.

Figure 2:
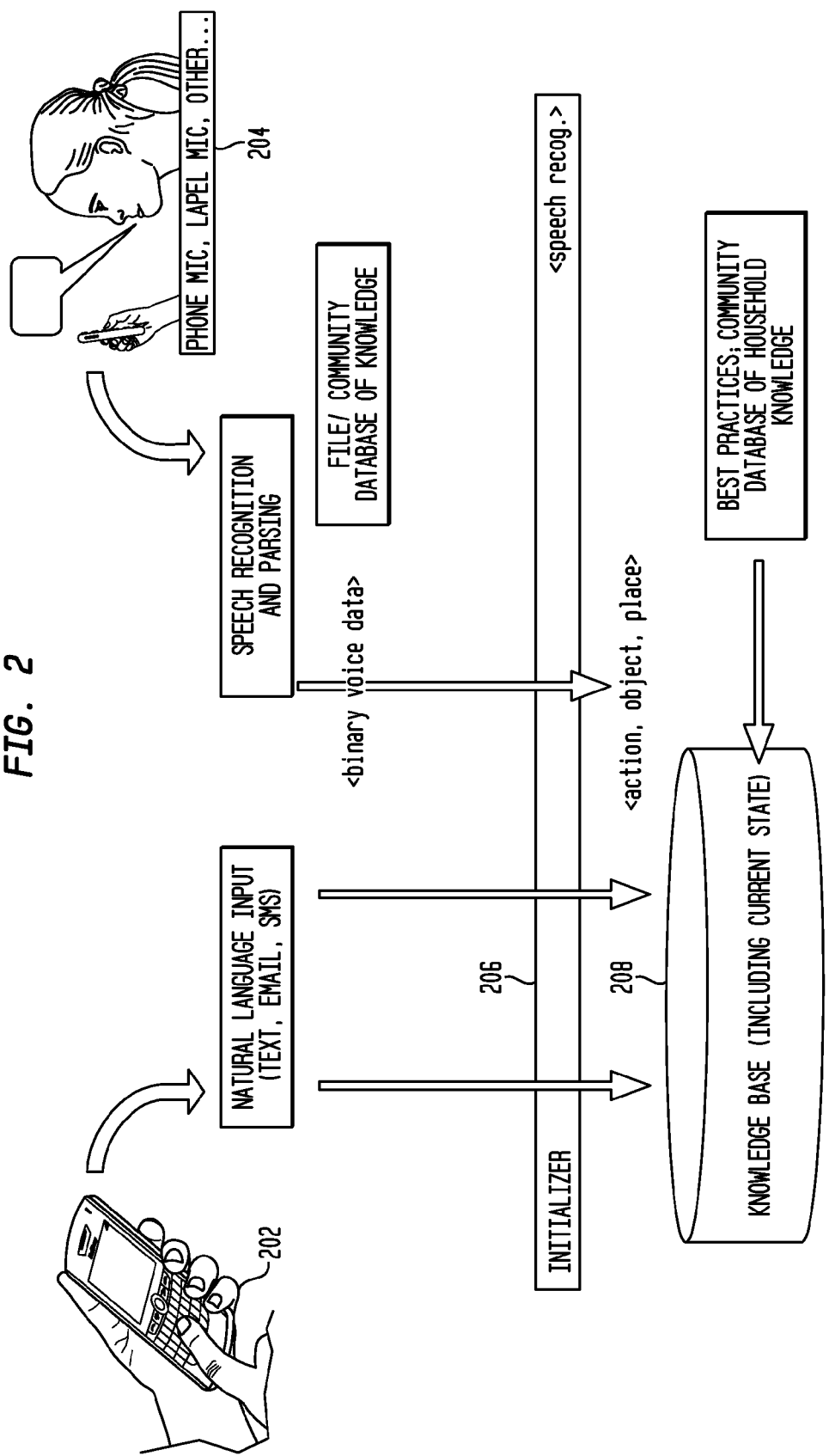
FIG. 2 illustrates how user input may enter the system in one embodiment.

FIG. 2 illustrates how user input may enter the system of the present disclosure in one embodiment. A user may enter data, for instance, in natural language, using for example, texting, email as shown at 202. A user may also enter voice data via, for example, microphone of a mobile device as shown at 204. Such entered data may be parsed and processed using a speech recognition or language parsing tool 206. The processed data is stored in a knowledge base 208.

The system knowledge base 208 is a model that encodes information in machine-readable form. This readable form then allows the system to compute over the information, making inferences and anticipatory suggestions that improve user productivity. The model may use a set of high-level classes (things) such as: objects, locations, actions, etc. The model may define a set of properties that relate objects to each other, for example tasks and subtasks associated with objects and/or locations. Properties can have inverse or symmetric pairs, which further enables inference regarding artifacts. Some of the artifacts modeled as classes may include, but are not limited to:

- Locations, with subtypes: region, point, room, floor, building, etc.
- Actions, with subtypes: move, disable, enable, take, pause, transport, put, start task, complete task, etc.
- Timing things or elements that allow machine understandable notions of "before", "after", "during", etc.

Functional properties of the knowledge model allow instances of the model (e.g. a particular "room" in a house) to be interrelated in semantically rich ways, to the benefit of subsequent notifications. Examples may include, but are not limited to:

- An object in the system—including the user—may have a dynamically changing location which, in the system, is represented as an association (either direct or indirect through a series of attribute interrelationships) between the object instance and a location instance.
- Locations can be related to other locations via spatial relationships including, but limited to: northOf, southOf, eastOf, westOf, above, below, nearTo, farFrom, containedBy, contains.
- Object location can have a degree of uncertainty from 0 (certain) to 1.0 (completely uncertain).
- Object can either (or both) have: a location (e.g. a room), and/or be coincident with another object (recursively) or that object may have a location.
- If the user declares her current location (e.g., "kitchen") the system can infer a "move" action from her last location to the current one.
- A pedometer/compass can emit "steps" into the system through an interface. Step patterns, such as those made when the user goes up a flight of stairs—can help the system infer location at the given moment. The system may improve location precision through step counting in conjunction with other knowledge (e.g., user declares "move to bedroom2" at which point steps are counted; since the physical layout is known the system knows the progress).

Tasks are a sequence of actions, including moving from place to place. A user's task efficacy (i.e., progress) may be inferred by counting steps taken between actions composing the task.

A pedometer/compass combination may report steps and current bearing; thus in the system if a past 'fix' location was known then current location can be estimated by understanding the spatial relationships (e.g., 'northOf'/ 'eastOf') between the 'fix' location and other locations, by using yet other spatial relationships (e.g., 'beside', 'near' and 'farFrom') in combination with step-counting and possibly hard position fixes injected by the user.

Figure 11:
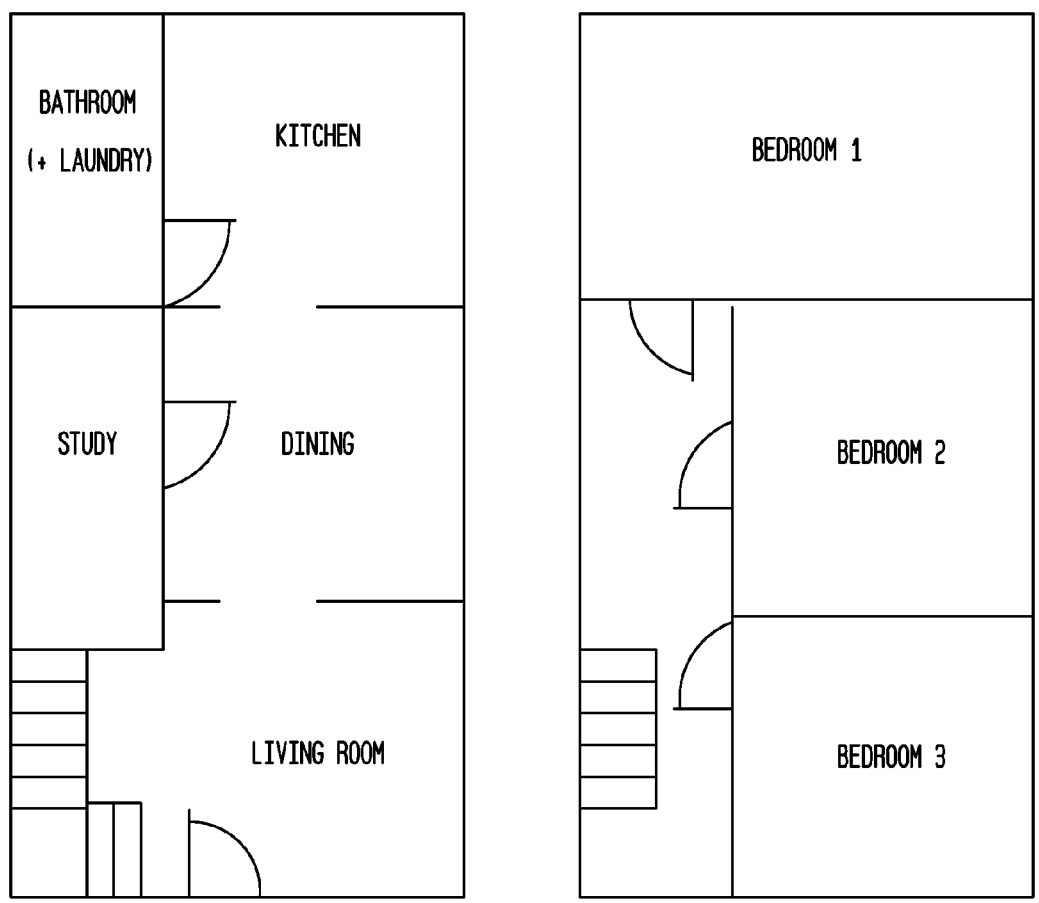
FIG. 11 illustrates an example of a layout of an environment.

The following describes a use case example for improving productivity while in the home. While the example uses the home environment, the system and method of the present disclosure may apply to other, for example, enclosed environments. Given a typical house layout such as the exemplary one shown in FIG. 11 (e.g., 2 levels with variously themed rooms), a knowledge model is instantiated. The system and method of the present disclosure may support and enable improved productivity in houses with this or more or less complex types of schematics.

A user may be upstairs BEDROOM3. The system of the present disclosure understands the current location with some non-zero uncertainty. The user moves to BEDROOM2, uses a verbally entered location fix to locate herself in BEDROOM2. The system parses the speech of the user and comes to know that the user is in BEDROOM2 and also infers that she is now "beside" BEDROOM1. The system sets the user location uncertainty to zero and finds a task (L) whose first action is in BEDROOM1 and suggests the user to start the task.

The user enables pedometer/compass and moves towards BEDROOM1. In response, the system observes that BEDROOM1 is "northOf" BEDROOM2 and BEDROOM3 is "southOr" BEDROOM2. The system begins counts the steps (which are being transmitted to the server 102), and direction (which is being transmitted to the server 102); at each step the uncertainty of user location may change slightly; after 10 steps "north" the system infers the users new Location BEDROOM1. The system finds tasks in BEDROOM1 to be L, and finds objects in the first action are "clothes_hamper" and confirms the location of the hamper is BEDROOM1. The system sends another reminder to start the task L with the first the first action.

The user uses either voice or device to make a 'start Task' action. The user may turn off pedometer/compass sensors or disallow them to transmit to server 102. The system updates the model to indicate task status of 'started' (and may provide user a summary of the actions in this task). The system removes uncertainty in the user location.

The user pickups the hamper, walks downstairs towards the laundry, and at stairs gives voice command "downstairs". In response, the system sets hamper object to be coincident with the user entity. The system updates the user location to be "Floor 1", puts all open tasks with actions on Floor 1 into an access queue, and removes any "uncertainty" in its model relating to location.

The user continues walking into "dining room". The system sees that current location "dining room" is nextTo Study. System finds that task T begins in study. As the current active task (L) has low-priority, system reminds user of the task T.

The user disregards task T for now (e.g., by making an input into the system or by ignoring the reminder) and continues on to kitchen. In response, the system comes to know of the user;s non-interest in task T and sees that task R begins in kitchen. As current active task (L) has low-priority, system suggests starting task R.

The user uses either voice or device to make 'start task' action for R (system updates). The system in response updates task L to 'paused' status, sets hamper object to no longer be coincident with user. The user puts down hamper, carries recycling out to the curb and returns to kitchen and uses either voice or device to make 'completed task' action for R. The system updates the status of task R and L appropriately.

The user enters bathroom/laundry room and the user's movement is sensed by system. The system suggests user make next action for the current task L. The user loads laundry machine and starts it, updating system by issuing an "enable wash-machine" command. The system may update task L with status "completed."

The following describes another use case example for improving productivity while in the home. In this case, the scenario is one of artifact metadata storage and retrieval.

As the system may exploit speech to text (or a simple GUI interaction) it can enable household artifacts to be registered and managed by the system by user input. Since location is always either explicitly entered or inferred, the knowledge base may relate objects and actions to locations and time. Search mechanisms allow artifacts to be found at a later time. For instance, a user may walk into the study room and the system may position her automatically (to some probability). The user physically files the deed to her home into a shelf in a desk (both the deed and the desk are objects with instances in the model) and declares a directive (e.g., verbally or with a GUI). The system creates indices to collocate the deed with the desk. The system leverages this new knowledge in future queries, use cases, and interactions.

A simpler version of the above use case which needs minimal intelligence on behalf of the server can be constructed in which the user explicitly declares "I am putting the house deed on the shelf in the study on the second floor" and the server records this voice stream, parses the language or tokens, and (correctly) attributes the location of the object (e.g., the deed) using the model. Alternatively, the voice utterance may be stored in its entirety. In the latter case, at a future date, when the user is now looking for the deed, she can ask "where is the house deed?" and the system attempts to find all the stored utterances that include the words "house deed" and replay them for the user. By listening to these replays the user can find the relevant location.

With regard to positioning systems and technologies, system and method of the present disclosure may rely on some external components to provide coarse-grain positioning but it is largely agnostic to the specifics of those components—e.g., motion sensors, heat sensors, video camera sensors—so long as their sensed data can be understood at the server 102. For fine-grain positioning, the system and method of the present disclosure may include a novel type of interaction that is referred to herein as a voice "directive" (in which a user speaks an audible utterance that can be used to help the positioning system determine current position) that can have the effect of reducing the system's current uncertainty level regarding the users position, and a way to incorporate step counting and direction into productivity analysis.

Figure 3:
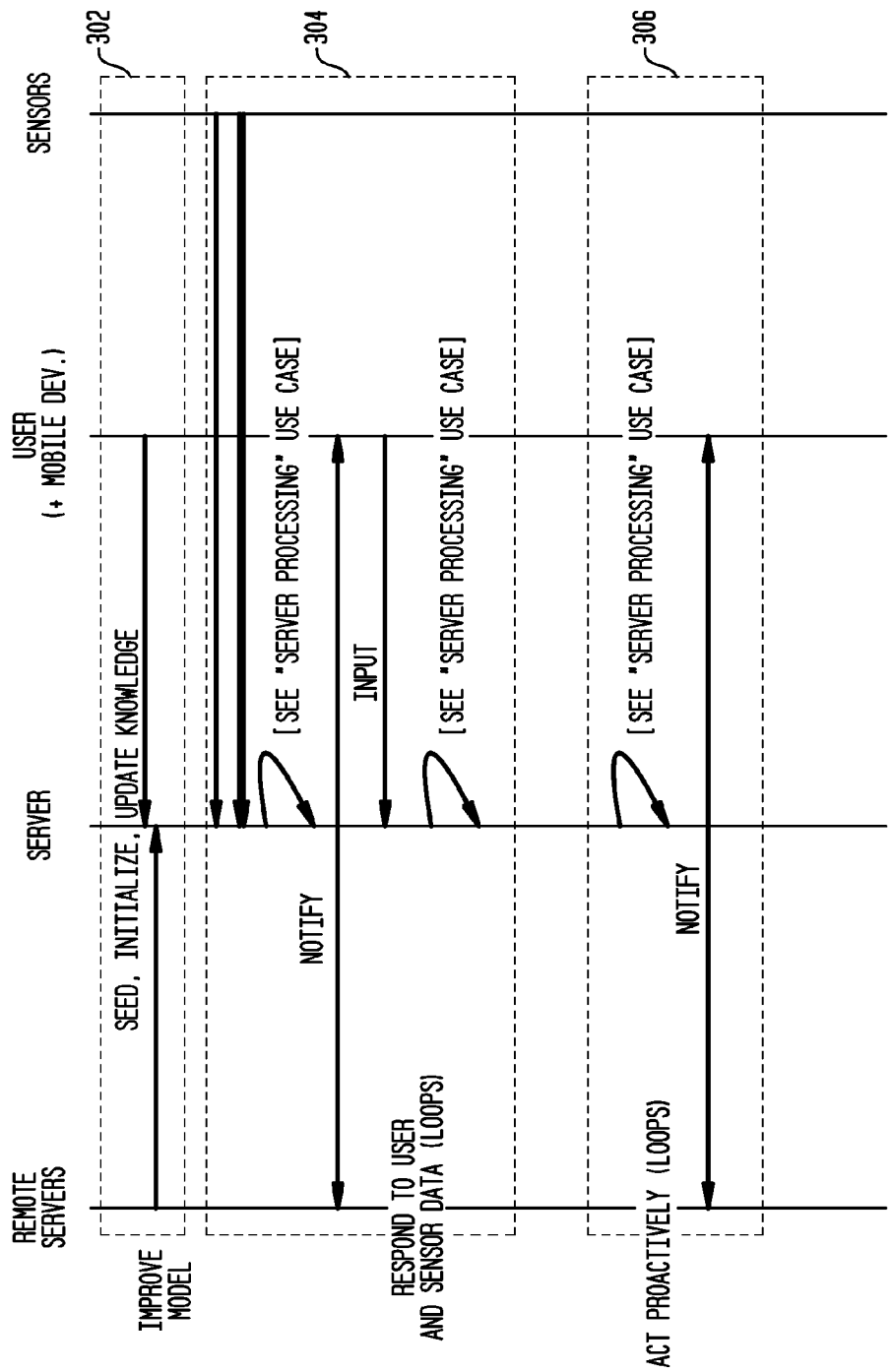
FIG. 3 illustrates a high-level control loop of the system in one embodiment.

FIG. 3 illustrates a high level control loop of the system in one embodiment. As shown at 302, the server, remote servers, user and mobile device may seed and initialize the knowledge base to include and improve a model that stores information about the location, objects, tasks associated with the locations and objects, and other relationships among the locations and objects. As shown at 304, the server responds to user input and user actions, as well as sensor data. For instance, the server may notify the user and other remote servers by computing a user's new locations and updating the users tasks. Also as shown at 306, the server may act proactively by first inferring user locations and tasks and optionally issuing some information to the user.

User position and other context may be reset from time to time, for instance, by having the user input voice directive or command into the mobile device. Each reset may improve the server's assumption of user positioning from the previous one. The first reset (or initialization) occurs when the user takes the device from its "dock" connected to a computer. As the user moves about the house (or another environment), each step or a series of steps may be recognized. The server positions the user "probabilistically" in a model based on the user's movements. In one aspect, steps and movements may be considered in clusters and the user's location within the house may be inferred probabilistically by examining all possible locations based on recent movement clusters and choosing the most likely location. User passage upon staircases may be inferred by both step counting and stride length estimation, which in turn may aid in positioning the user accurately (e.g., in the z-axis as the stairs are used to change level).

Each subsequent action may strengthen or weaken probabilistic positions. Periodically, the user may reset the system via a voice command. The command may be in natural language or using grammar from a pre-trained library. For example, a reset may be a location declaration, "I am at position the bathroom". Reset may be an action that can be used to infer location, e.g., "I am starting the laundry machine", "putting deed into dresser". Reset may be input from another device, e.g., user turns on TV and a signal is captured automatically and emitted to the system (e.g., the server) so that the system detects the TV being turned on automatically. After receiving such resetting inputs, the model may be updated to reflect the current state of the user.

Figure 4:
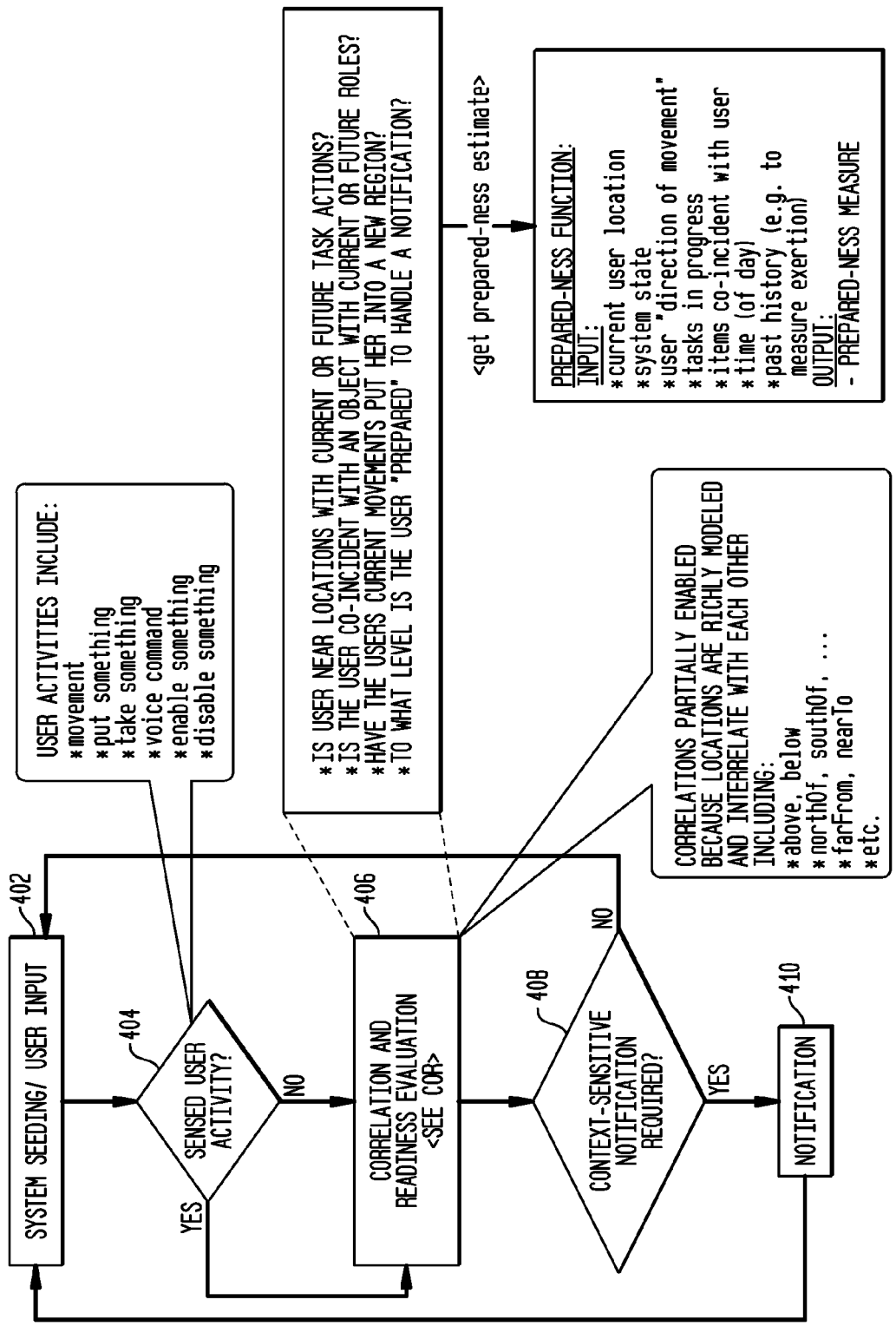
FIG. 4 shows system computation flow in one aspect.

FIG. 4 shows system computation flow in one aspect. At 402, the system is seeded, e.g., with information about the environment, for example, home or like enclosed environment with its objects and location information, one or more user input and/or one or more user action. A data model, for example, may be created that models the environment with its objects, location information and related tasks, and other information. This may be an on-going process with the model being updated with new or changed information about the environment. The updating of the model metadata or instances may be performed dynamically as the information changes, or periodically at a predetermined interval.

At 404, the system (e.g., the server) senses user activities. Example of user activities may include but are not limited to user movement, user putting something, user taking something, user inputting voice command, user enabling something, user disabling something. User activities may be detected via devices such as sensors and mobile devices or informed directly by the user via an appropriate interface technology. The server 102 processes and understands these actions.

At 406, the system correlates the user activity and also may perform readiness evaluation. Correlations are partially enabled because locations are richly modeled and interrelate with each other, for example with following spatial relationships: above, below, northOf, southOf, farFrom, nearTo, etc. Readiness evaluation may estimate whether a user is near locations with current or future task actions, whether the user is co-incident with an object with current or future roles, whether the user's current movements put her into a new region, level to which the user is "prepared" to handle a notification, etc. Prepared-ness function may determine preparedness measure from parameters such as the current user location, system state, user "direction of movement", tasks in progress, items co-incident with user, time (of day), or past history (e.g., to measure exertion) or combinations thereof. Preparedness measurement may be used to determine whether and what activity to suggest to the user. In one embodiment, the system may determine, by examining the system state, a user "ready" to perform a task because the user is at a particular location in the environment, but not "prepared" because the required objects to begin the task are not co-incident with the user.

At 408, it is determined whether context-sensitive notification is required. Context-sensitive notification refers to a notification that is generated with regard to the current state of the system (e.g., the current location of the user). If no notification is required the method proceeds to 402 to wait, for example, for user input and/or user activity. If notification is needed, however, a notification may be generated for the user. This notification may be, for example, a helpful suggestion whose goal is to increase efficiency of the user's actions, and it may be delivered, for example, to a mobile device on the person of the user.

Figure 5:
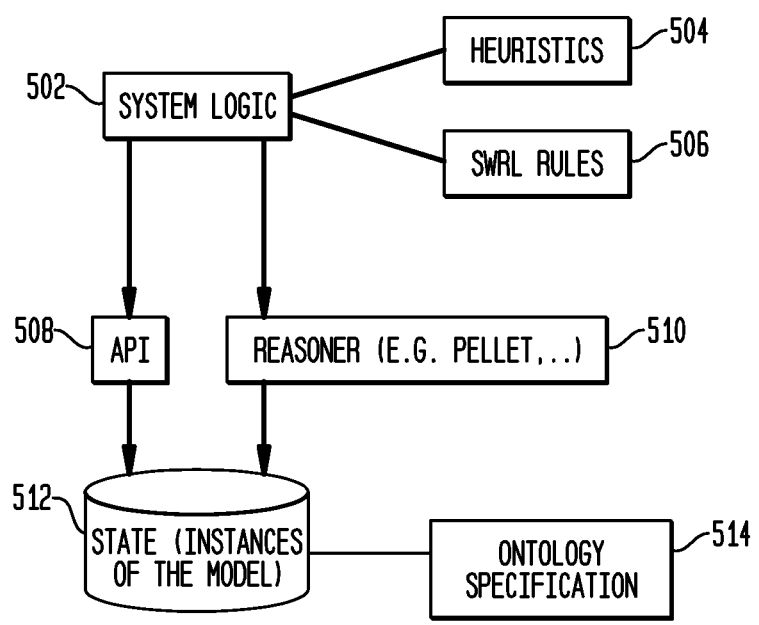
FIG. 5 is a diagram illustrating components of the present disclosure in one aspect.

FIG. 5 is a diagram illustrating components of the present disclosure in one aspect. System logic (e.g., the logic in the server shown in FIG. 1) may utilize an application program interface (API) 508 to store and retrieve information from state model 512. For example, voice recognition or simple graphical user interface (GUI) may allow household or the like actions to be registered and stored. Information in the model 512 may be created, added, parsed, searched or otherwise manipulated, using an application program interface (API). An example of an API is JENA™ API. The system logic 502 may infer location using the state information 516. The state information 512 may be stored and retrieved as a database such that attributes can interrelate instances. An extensible model, for example, an ontology specification 514, may be used as a reference to specify storage structure and/or the classes, attributes and relationships encoded in the state or model storage 512 for managing objects and their relationships.

Briefly, an ontology is a formal representation of a set of concepts within a domain and the relationships between or among those concepts. Ontology may be used, in part, to reason about the properties of that domain, and may be used to define the domain. An ontology specification 514 defines a model for describing the environment that includes a set of types, properties, and relationship types.

The system logic 502 may utilize heuristics 504, rules 506 and the state information to infer current location, and determine associated tasks and activities to suggest. A reasoning tool 510 (also referred to as a reasoner, reasoning engine, an inference or rules engine) may be able to infer logical consequences from a set of asserted facts, for example, specified in the heuristics 504, rules 506 and state information 512. Pellet™ is an example of a reasoning tool 512. Other tools may be used to infer user locations and to provide suggestions.

In addition, an instance of the model 512 may be created to capture physical layout of the house, functional layout, and/or personalized layout (e.g., some users may make different use of the same room). A reference model of a typical house can be used to help the system store and relate objects. For instance, a typical house may provide a default "index" of common objects and their associations with particular places in the house (e.g., towels, water, sink, in bathroom). Search mechanism allows objects to be found at a later time. For example, a sample flow may be that the user walks to the den. In response, the system positions the user automatically thereabouts to a degree of probability. The user physically files the home deed into a shelf in a desk and declares the action verbally into the system, and the system stores the information in a database with multiple indices allowing future searching and processing (e.g., a search "by room" or "by floor").

The model 512 may be implemented to recognized the following grammar (although not limited to only such): actions such as doing, putting, going, leaving, finishing, starting, taking, cleaning, including derivations and/or decompositions of those forms; subjects that include an extensible list from a catalog, e.g., deed, closet, washing machine; places such as n-th floor (e.g., $2^{nd}$ floor), bedroom, bathroom, armoir, and others; temporal such as now, later, actual time, and others. An example usage of such grammar may be:

action:subject:place:place:: "putting deed $3^{rd}$ drawer armoir";
action:subject:time:: "starting laundry now";
action:subject:: "leaving $2^{nd}$ floor".

The system is able to parse these composed utterances by extracting and recognizing the individual parts and updating the system state.

Figure 6:
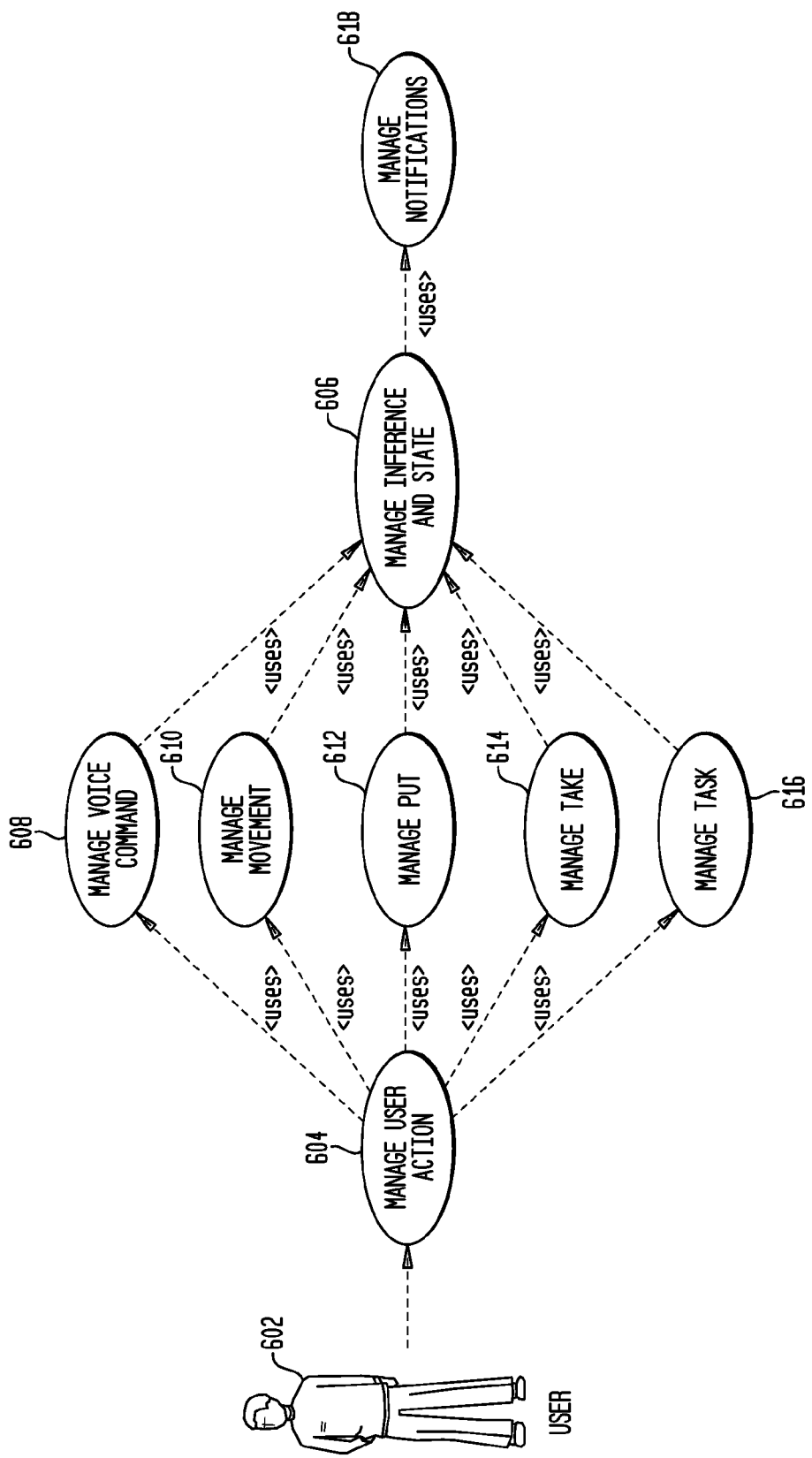
FIG. 6 illustrates a high-level use case diagram in one aspect.

FIG. 6 illustrates a high-level use case diagram in one aspect. One or more user actions 604 of a user 602 are used to infer user state, location 606. User actions may include (but not limited to) voice command 608, movement 610, putting 612, taking 614, and/or performing a task or activity 616. The inferred state and location 606 may be further used to determine notifications 618. Notifications, for example, may include advising or suggesting tasks, activities to start, reminding the user to complete an unfinished task, and others. Notifications may occur via devices such as but not limited to, smartphone, home computer, television, home speaker system, and/or others.

The following scenarios illustrate advising or notifying the user. Voice activation 608, for example, may trigger notification 618. For example, the user may input using voice or speech a notice indicating that a task was begun, e.g., "starting laundry now." The input is parsed and decomposed, and the state is updated accordingly (606). The current user's state (e.g., encoded in ontology) may be compared and used to make inferences about what next steps are required and where (606). The inferred steps may be logged and notification (618) sent to the user. In this particular example, the inferred step may be "put laundry in dryer". The system further infers that this step should be performed after the washing machine cycle is finished, which may be recorded as taking 45 minutes for example. Therefore, in this example, the system may send a message, "put laundry in dryer" in about 45 minutes from the time the user input the voice activation, for instance, unless the user is already near that goal.

As another example, the user's goals may be monitored in an on-going manner. For example, the system may monitor user's long term goal. An example may be to clean the attic. In this example, the system may monitor "clean attic" as a goal and the associated states. Every time the user is near the attic, and for example, the user's current state is "not busy with other things", the user may be reminded of this long term goal task, i.e., "clean attic." For example, user context may include cleaning attic as a long running task, doing laundry as a medium running task. For this long running task, a rule such "when near attic: 1) take an item from attic, 2) go downstairs" may be implemented. For the medium running task in this example, a rule "1) get laundry, 2) bring to machine, 3) start, 4) finish" may be implemented. A user voice may reset in den. Then the user may walk up the stairs. The system detects the user's movement and updates the user context. The system may use ontology to suggest "get laundry" and to suggest "cleaning attic", for example, by taking some items downstairs. The user may choose pause the "cleaning attic" reminder, but get laundry, take it down to the machine and input, "starting laundry now." The system updates the user context again, and sets a reminder for 45 minutes from now. Later, when the user is upstairs and the system infer the user's location, the user may get another "clean attic" reminder.

User may also specify the task status to "finished", and the system updates the state of the model accordingly.

In another aspect, reminder or notifications may be followed by feedback request. For instance, the reminder or notifications may carry a click box that asks "was this helpful?" or "click here if you are not in this context" or other feedback questions. User feedback in this manner may reinforce suggestion classes that work well and inhibit poor ones.

The system and method of the present disclosure in one aspect utilizes location estimation after a reset followed by several steps, improves estimation by using spatial metadata, past actions, and use activities. Localization may be improved by clustering steps and inferring the staircase. In step clustering, the system may group together steps that occur in particular time series or with particular attributes. For example, when ascending a staircase one's steps are of decidedly similar stride-length and may have particular regularity. With a priori knowledge of the number of steps in the staircase the system infers the use of the staircase when it detects n steps with similar stride and regularity from an origin near the staircase base.

Figure 7:
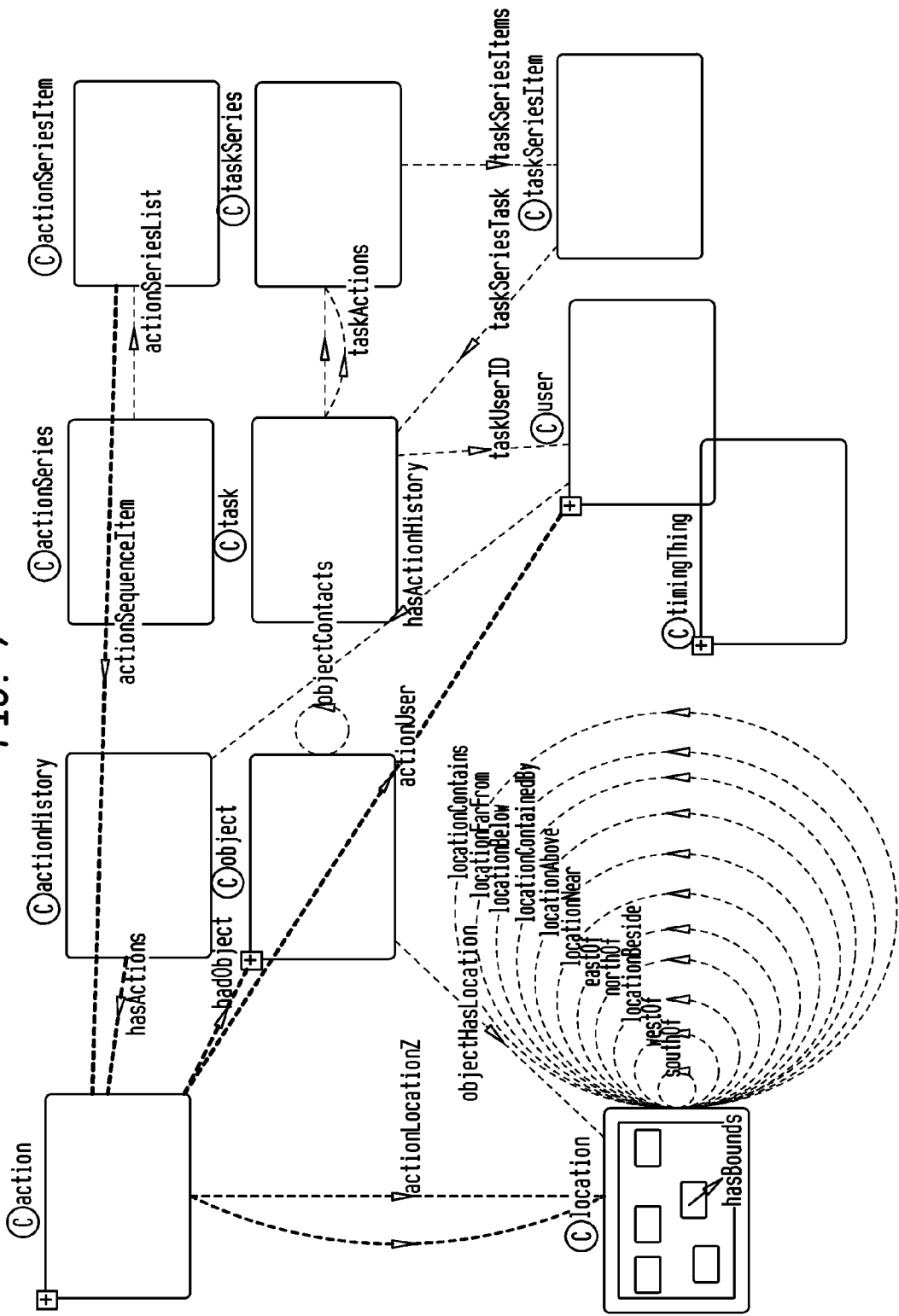
FIG. 7 shows examples of properties and their domains and ranges.

FIGS. 7-10 illustrate data and semantic models that may be utilized in the system and method of the present disclosure. FIG. 7 shows examples of properties and their domains and ranges. In the system model example, an action instance is associated with a location instance that in turn can be related with other location instances through relationships such as "northOf". An action is associated with the user instance that in turn is associated with a number of task instances through the taskUserID relationship. An action is associated with an object instance which may in turn have associations with other object instances through an objectHasLocation or objectCoincidentWithObject relationship. Location or Task and action instances are grouped by taskSeries and actionSeries instances. A task has a relationship to a timingThing instance which provides temporal structure and constraints to the task.

Figure 8:
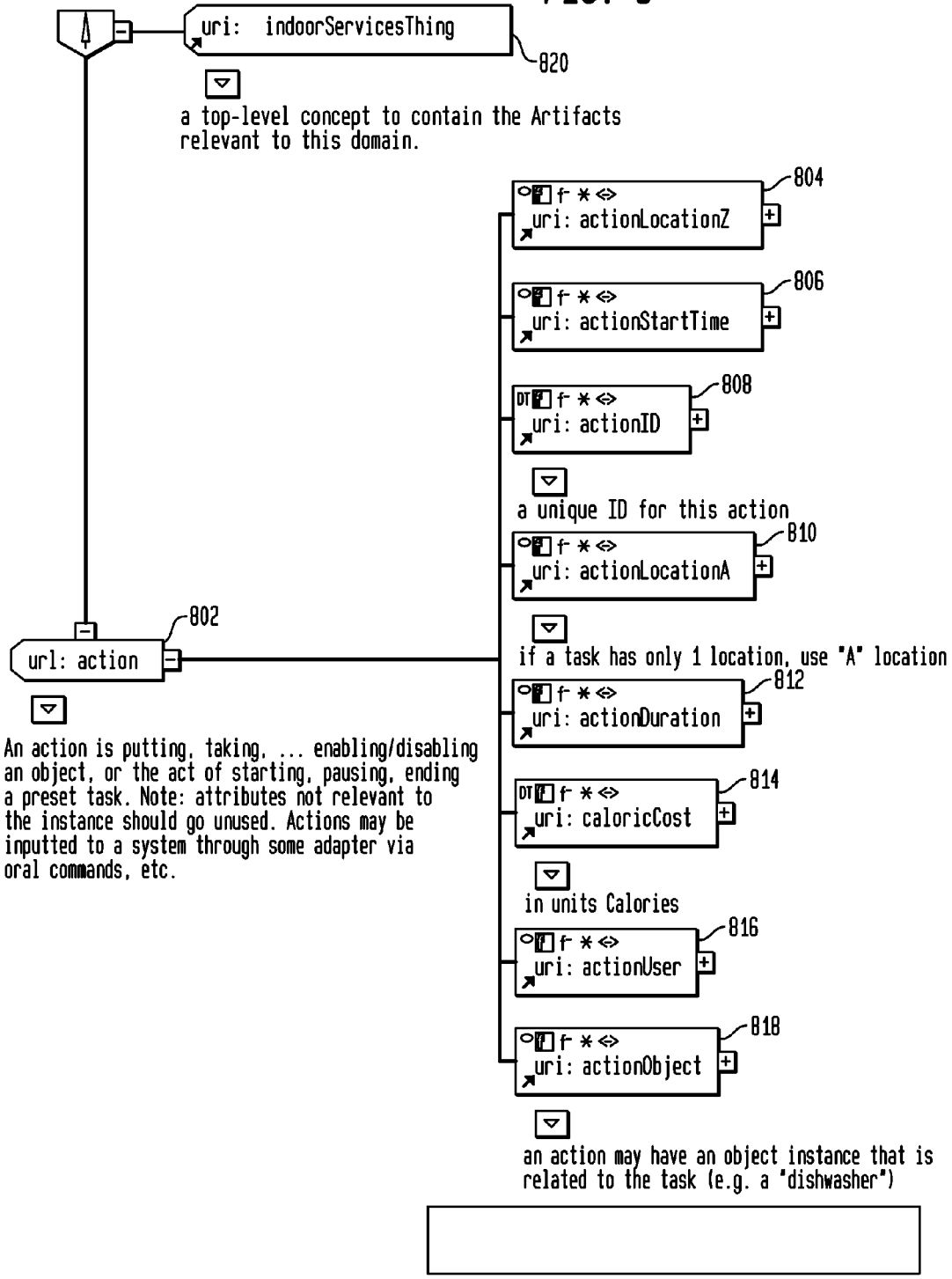
FIG. 8 illustrates example properties of an action object as an example.

FIG. 8 illustrates example properties of an action object as an example. An "action" element 802 may correspond to a real-world activity, which may include but is not limited to: putting, taking, enabling/disabling an object, or the act of starting, pausing, ending a preset task. As described above, actions may be input to a system through an adapter via oral commands, button clicks, typing, or other inputting methods. An action element may be an element of a top-level concept, for example, "indoorServicesthing" element 804. A top-level concept 820 may be the parent of many artifacts in a domain. Attributes of the action element 802 may include "actionLocationZ" 804 (the ending place of the action), "actionStartTime" 806, "actionID" 808 (a unique identifier), "actionLocationA" 810 (the starting place of an action), "actionDuration" 812, "CaloricCost" 814 (the estimated caloric expenditure that this action requires), "actionUser" 816 (the user instance performing the action), and "actionObject" 818 (the object involved in the action). ActionLocationZ attribute 804 may describe the location of the action; actionStartTime attribute 806 may specify the time the action began; actionID attribute 808 may identify this action with a unique identifier (id); actionLocationA 810 may describe the location associates with a task associated with this action; actionDuration attribute 812 may specify the duration the action lasted; caloricCost attribute 814 may specify the number of calories the user may expand performing this action; actionUser attribute 816 may identify the user, for example, by user identification such as name or others; and actionObject attribute 818 may specify an object associated with this action.

Figure 9:
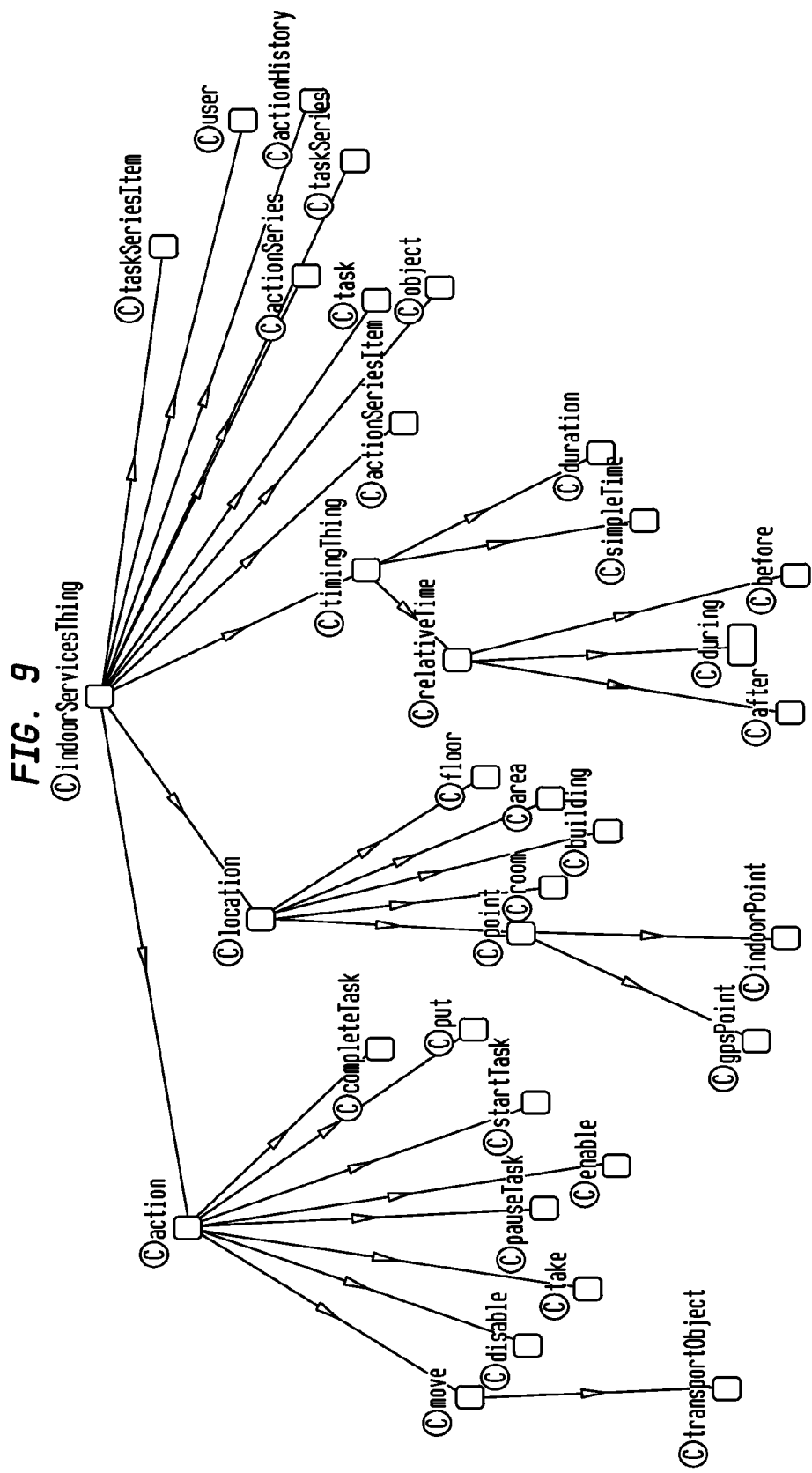
FIG. 9 illustrates an example class hierarchy of a knowledge model.

FIG. 9 illustrates an example class hierarchy of a knowledge model. In one embodiment, from a top level class that may be the ascendant of every other in the system, the model captures relevant information by using classes including but not limited to actions, locations, timingThings, users, tasks, objects, actionSeries, taskSeries, actionSeriesInstances, and taskSeriesInstances. These classes form, in part, the parent-child relationships of the system ontology and allow separation of concern while also allowing computation over these objects and their children. For example, the location class may have subclasses that comprise more specific types of locations that are understood by the system: floor, room, building, etc. Similarly, the action class may have subclasses comprising more specific types of actions understood by the system. Similarly, the timingThing may help the system encode all the subclasses of timing artifacts including relative and absolute time classes.

Figure 10:
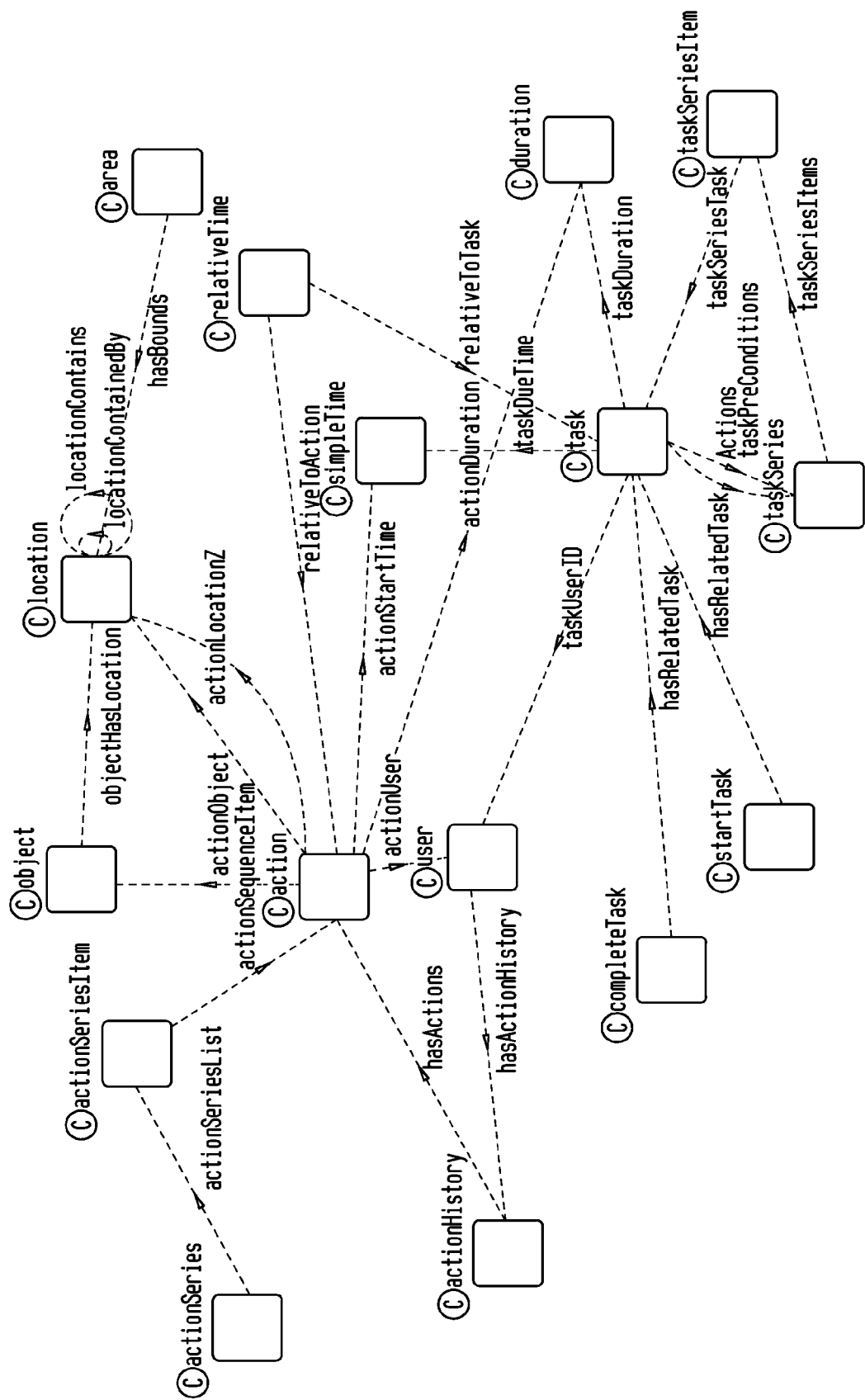
FIG. 10 illustrates example objects in a knowledge model with directed arcs representing properties and their ranges.

FIG. 10 illustrates example objects in a knowledge model with directed arcs representing properties and their ranges. For example, the figure illustrates that a task instance may have a due date time with the attribute taskDueTime to the class simpleTime. It may also have an expected taskDuration attribute with a relation to the class duration. Other relationships follow in this way so that the end result is a knowledge model of objects through a series of well defined classes.

The system and method of the present disclosure may be part of a category of next generation personal information services that involve the use of sensors, mobile devices, intelligent databases and fast context based event processing. This class of services of the "smart space" may include healthcare, wellness, Telematics and many other services.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations; elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for improving personal productivity in an environment, comprising:
   a processor;
   a knowledge base operable to store state information, rules, attributes and associations, associated with an environment, objects associated with the environment, and one or more users; and
   a server module operable to detect activity of a user and infer location of the user, the server module further operable to suggest one or more tasks to be performed based on the detected activity or inferred user location or combinations thereof;
   wherein the knowledge base is modeled according to an ontology specification that captures the semantics of users, objects, locations, tasks, and actions that comprise tasks.

2. The system of claim 1, further including:
a mobile device co-located with a user and operable to receive one or more user input commands and communicate the one or more user input commands to the server module.

3. The system of claim 2, wherein the one or more user input commands include voice commands, input via a user interface input, or combinations thereof.

4. The system of claim 1, further including:
a plurality of sensors operable to report presence of the user at a location in the environment.

5. The system of claim 4, wherein the plurality of sensors are operable to detect user activity.

6. The system of claim 4, wherein the plurality of sensors are operable to wirelessly communicate information to the server module.

7. The system of claim 1, wherein the server module is operable to infer the location of the user to within a particular certainty based on last received user input command and information stored in the knowledge base.

8. The system of claim 1, wherein the activity of the user includes voice commanding, moving, putting objects, taking objects, performing tasks, or combinations thereof.

9. The system of claim 1, wherein the server module is further operable to update the knowledge base with information associated with the detected activity, inferred location, or combinations thereof, and trigger one or more actions.

10. The system of claim 1, wherein the suggested one or more tasks to be performed based on the inferred user location are for completion of one or more of a user's long term goals.

11. The system of claim 1, wherein the server is further operable to determine future one or more tasks to be performed and a time at which to send a notification to perform the determined future one or more tasks, based on the detected activity or inferred location or combinations thereof.

12. The system of claim 1, wherein the state information associated with the environment includes environment's layout, one or more objects in the environment, environment's relationship with the one or more objects, and objects' relationships among the one or more objects and users.

13. The system of claim 1, wherein the server is operable to infer the location based partly on pedometer output counting one or more steps the user has taken since a given past state.

14. The system of claim 1, wherein the server is further operable to receive feedback associated with the one or more suggestions provided to the user.

15. The system of claim 1, wherein the server is further operable to locate an object based on the detected activity, the inferred location, or combinations thereof.

16. A method of improving personal productivity in an environment, comprising:
storing state information associated with an environment and one or more users in a knowledge base,
detecting activity of a user;
inferring location of the user based on the detected activity; and
suggesting one or more tasks to be performed based on the inferred user location;
wherein the state information is stored according to an ontology specification that captures the semantics of users, objects, locations, tasks, and actions that comprise tasks.

17. A non-transitory computer readable storage medium storing a program of instructions executable by a machine to perform a method of improving personal productivity in an environment, comprising:
storing state information associated with an environment and one or more users in a knowledge base, wherein the knowledge base is modeled according to an ontology specification that captures the semantics of users, objects, locations, tasks, and actions that comprise tasks;
detecting activity of a user;
inferring location of the user based on the detected activity; and
suggesting one or more tasks to be performed based on the inferred user location.

18. The non-transitory computer readable storage medium of claim 17, wherein the inferring location includes using the state information associated with the environment and the detected activity of the user to infer current location of the user.

19. The non-transitory computer readable storage medium of claim 17, wherein the detecting activity includes sensing user present using a plurality of sensors distributed in the environment.

20. The non-transitory computer readable storage medium of claim 17, wherein the detecting activity includes receiving user input commands.

21. The non-transitory computer readable storage medium of claim 17, wherein the state information is stored according to an ontology specification.

22. The non-transitory computer readable storage medium of claim 17, wherein the activity of the user includes voice command, movement, put action, take action, or a task performance, or combinations thereof.

23. The non-transitory computer readable storage medium of claim 17, wherein the detecting activity includes receiving user input commands via a mobile device co-located with the user.

24. The non-transitory computer readable storage medium of claim 23, wherein the user input commands include voice commands, input via a user interface input, or combinations thereof.

25. The non-transitory computer readable storage medium of claim 17, further including:
determining one or more future tasks the user should perform based on the detected activity and the inferred location;
determining a time at which to send a notification to the user to perform the determined one or more future tasks.

26. The non-transitory computer readable storage medium of claim 17, further including:
receiving feedback associated with the suggesting.

* * * * *

UNITED STATES PATENT AND TRADEMARK OFFICE
CERTIFICATE OF CORRECTION

PATENT NO.        : 8,620,846 B2                                       Page 1 of 1
APPLICATION NO.   : 12/691077
DATED             : December 31, 2013
INVENTOR(S)       : Falchuk et al.

It is certified that error appears in the above-identified patent and that said Letters Patent is hereby corrected as shown below:

In the Specification

In Column 2, Line 32, delete "perforin" and insert -- perform --, therefor.

In Column 7, Line 39, delete ""southOr"" and insert -- "southOf" --, therefor.

In Column 13, Line 61, delete "operations;" and insert -- operations, --, therefor.

In the Claims

In Column 15, Line 53, in Claim 16, delete "base," and insert -- base; --, therefor.

Signed and Sealed this
Second Day of December, 2014

Michelle K. Lee
*Deputy Director of the United States Patent and Trademark Office*